(12) United States Patent
Blazer et al.

(10) Patent No.: US 9,939,599 B2
(45) Date of Patent: Apr. 10, 2018

(54) ROLLABLE OPTICAL FIBER RIBBON

(71) Applicant: Corning Optical Communications LLC, Hickory, NC (US)

(72) Inventors: Bradley Jerome Blazer, Granite Falls, NC (US); Dana Craig Bookbinder, Corning, NY (US); Ming-Jun Li, Horseheads, NY (US); Alan Todd Parsons, Newton, NC (US); Pushkar Tandon, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/216,757

(22) Filed: Jul. 22, 2016

(65) Prior Publication Data

US 2017/0031121 A1    Feb. 2, 2017

Related U.S. Application Data

(60) Provisional application No. 62/199,281, filed on Jul. 31, 2015.

(51) Int. Cl.
    *G02B 6/44* (2006.01)

(52) U.S. Cl.
    CPC .......... *G02B 6/4404* (2013.01); *G02B 6/443* (2013.01); *G02B 6/4434* (2013.01)

(58) Field of Classification Search
    CPC ..... G02B 6/4404; G02B 6/4434; G02B 6/443
    See application file for complete search history.

(56) References Cited

U.S. PATENT DOCUMENTS

| 5,212,756 | A | 5/1993 | Eoll | |
|---|---|---|---|---|
| 5,682,454 | A * | 10/1997 | Gaillard | G02B 6/448 174/117 F |
| 6,584,257 | B1 | 6/2003 | Hurley et al. | |
| 7,050,688 | B2 * | 5/2006 | Lochkovic | G02B 6/4402 385/114 |
| 8,412,014 | B2 | 4/2013 | Sato et al. | |
| 8,548,294 | B2 | 10/2013 | Toge et al. | |
| 8,787,718 | B2 | 7/2014 | Tanabe et al. | |
| 2005/0013573 | A1 | 1/2005 | Lochkovic et al. | |
| 2005/0117859 | A1 * | 6/2005 | Suzuki | G02B 6/448 385/114 |

(Continued)

FOREIGN PATENT DOCUMENTS

JP    03685520 B2    8/2005
JP    20133516 A     6/2008

(Continued)

OTHER PUBLICATIONS

International Search Report and Anritten Opinion PCT/US2016/042454 dated Oct. 5, 2016.

*Primary Examiner* — Ryan Lepisto
(74) *Attorney, Agent, or Firm* — William D. Doyle

(57) ABSTRACT

An optical ribbon is provided. The optical ribbon includes a plurality of optical transmission elements. The ribbon includes a ribbon body coupled to and supporting the plurality of optical transmission elements. The ribbon body is formed from a flexible polymeric material such that the plurality of optical transmission elements are reversibly movable between an aligned position in which the plurality of optical transmission elements are substantially parallel with each other and a curved position.

19 Claims, 9 Drawing Sheets

(56) References Cited

U.S. PATENT DOCUMENTS

| | | | |
|---|---|---|---|
| 2011/0110635 A1 | 5/2011 | Toge et al. | |
| 2013/0022325 A1* | 1/2013 | Kachmar | G02B 6/44 385/114 |
| 2013/0156390 A1 | 6/2013 | Matsuzawa et al. | |
| 2014/0112631 A1 | 4/2014 | Namazue et al. | |
| 2016/0016905 A1 | 1/2016 | Aoki et al. | |

FOREIGN PATENT DOCUMENTS

| | | |
|---|---|---|
| JP | 04143651 B2 | 9/2008 |
| JP | 2011221320 A | 11/2011 |
| JP | 04966920 B2 | 7/2012 |
| JP | 04980841 B2 | 7/2012 |
| JP | 05117519 B2 | 1/2013 |
| JP | 05158893 B2 | 3/2013 |
| JP | 05200093 B2 | 5/2013 |
| JP | 05224403 B2 | 7/2013 |
| JP | 05253474 B2 | 7/2013 |
| JP | 2013160882 A | 8/2013 |
| JP | 05291042 B2 | 9/2013 |
| JP | 2013182146 A | 9/2013 |
| JP | 2013195534 A | 9/2013 |
| JP | 05311165 B2 | 10/2013 |
| JP | 05328972 B2 | 10/2013 |
| JP | 2013205501 A | 10/2013 |
| JP | 05354751 B2 | 11/2013 |
| JP | 2013228647 A | 11/2013 |
| JP | 2013238719 A | 11/2013 |
| JP | 2013250466 A | 12/2013 |
| JP | 2013257394 A | 12/2013 |
| JP | 05380396 B2 | 1/2014 |
| JP | 05391296 B2 | 1/2014 |
| JP | 2014010439 A | 1/2014 |
| JP | 2014016528 A | 1/2014 |
| JP | 2014016529 A | 1/2014 |
| JP | 2014016530 A | 1/2014 |
| JP | 05411784 B2 | 2/2014 |
| JP | 2014038146 A | 2/2014 |
| JP | 05450687 B2 | 3/2014 |
| JP | 05469044 B2 | 4/2014 |
| JP | 2014071441 A | 4/2014 |
| JP | 2014074910 A | 4/2014 |
| JP | 05503383 B2 | 5/2014 |
| JP | 2014085512 A | 5/2014 |
| JP | 2014085592 A | 5/2014 |
| JP | 2014095560 A | 5/2014 |
| WO | 2011043324 A1 | 4/2011 |
| WO | 2013058206 A1 | 4/2013 |
| WO | 2013065640 A1 | 5/2013 |
| WO | 2013165407 A1 | 11/2013 |

* cited by examiner

ROLLABLE OPTICAL FIBER RIBBON

CROSS-REFERENCE TO RELATED APPLICATIONS

This application claims the benefit of priority to U.S. Provisional Application No. 62/199,281, filed on Jul. 31, 2015, and is incorporated herein by reference.

BACKGROUND

The disclosure relates generally to optical fibers and more particularly to optical communication or fiber ribbons. Optical fibers have seen increased use in a wide variety of electronics and telecommunications fields. Optical fiber ribbons may hold multiple optical fibers together in a group or array. The optical fiber ribbon includes a body formed from a material that holds the optical fibers together and/or that provides structure that assists in the handling and connecting of the optical fibers of the ribbon to various components or devices.

SUMMARY

One embodiment of the disclosure relates to a rollable optical fiber ribbon including a plurality of optical transmission elements. Each optical transmission element includes an optical core surrounded by a cladding of a different refractive index than the optical core, and the cladding is surrounded by a fiber coating layer. The fiber coating layer has an inner surface contacting the cladding and an outer surface defining an exterior surface of the optical transmission elements. The ribbon also includes a ribbon body coupled to and supporting the plurality of optical transmission elements in an array. The ribbon body is contiguous lengthwise for at least 10 cm along the length of the plurality of optical transmission elements and is contiguous widthwise over the plurality of optical transmission elements. The ribbon body is formed from a flexible polymeric material such that the plurality of optical transmission elements are reversibly movable from an unrolled position in which the plurality of optical transmission elements are substantially aligned with each other to a rolled position.

An additional embodiment of the disclosure relates to an optical ribbon that includes a plurality of optical transmission elements, and each optical transmission element includes an optical core and an exterior surface. The ribbon includes a ribbon body coupled to and supporting the plurality of optical transmission elements. The ribbon body is contiguous lengthwise for at least 10 cm along the length of the plurality of optical transmission elements. The ribbon body is formed from a flexible polymeric material such that the plurality of optical transmission elements are reversibly movable between an aligned position in which the plurality optical transmission elements are substantially parallel with each other and a curved position. Each of the plurality of optical transmission elements includes a central axis extending through a center point of the optical core. In the aligned position at least 90% of the polymeric material of the ribbon body is located on one side of central axes of the plurality of optical transmission elements.

An additional embodiment of the disclosure relates to an optical fiber ribbon that includes a plurality of optical fibers and a flexible ribbon body coupled to and supporting the plurality of optical fibers. The ribbon body is contiguous lengthwise for at least 10 cm along the length of the plurality of optical fibers. The ribbon body is formed from a flexible polymeric material such that the plurality of optical fibers are bendable around a longitudinal axis of the ribbon. Each of the plurality of optical fibers includes a central axis, and at least 90% of the polymeric material of the ribbon body is located on one side of the central axes of the plurality of optical fibers. The ribbon body partially surrounds the plurality of optical fibers such that an outer surface of the ribbon body defines an outermost surface on a first side of the ribbon, and exterior surfaces of the optical fibers define an outermost surface on a second side of the ribbon opposite the first side of the ribbon.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical ribbon are shown. In general, the ribbon embodiments disclosed herein are configured to allow the ribbon to be bent, curved or rolled from an unrolled position to a rolled or curved position. In such embodiments, optical transmission elements (e.g., optical fibers) are coupled to and supported by a ribbon body. The ribbon body is formed from a material and configured to provide sufficient support, structure and protection to the optical fibers of the ribbon, while at the same time allowing the ribbon to be rolled and unrolled as needed.

Specifically, in various embodiments, the ribbon embodiments disclosed herein utilize a ribbon body that partially surrounds the optical fibers. In various embodiments, the ribbon body is contiguous both lengthwise and widthwise over the optical fibers. In various embodiments, substantially all of the ribbon body is located on one side of the central ribbon plane. Applicant believes the configurations of the ribbon body discussed herein provides sufficient rollability while still providing sufficient support and protection to the optical fibers. Further, in various embodiments, the ribbon body is formed from a polymer material that has an elasticity and/or thickness that further facilitates the rollability of the ribbon. Providing a rollable optical fiber ribbon as discussed herein may provide a number of benefits as compared to conventional optical fiber ribbons or conventional loose buffered optical fibers including increased fiber count, higher packing density, easier connectorization, higher transmission rates, decreased ribbon size and may eliminate the need for buffer tubes, in at least some applications.

Figure 1:
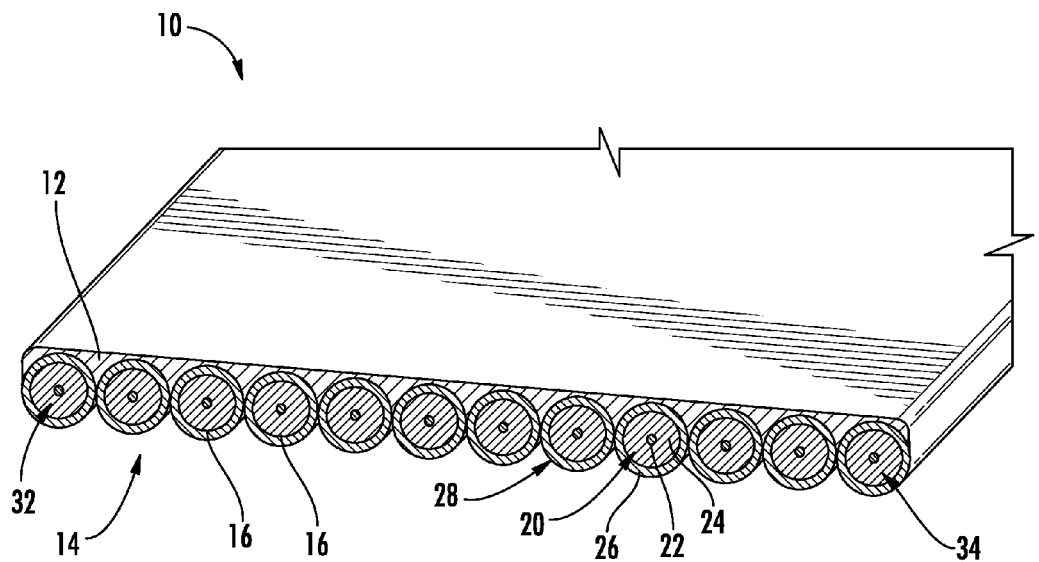
FIG. 1 shows a perspective view of a rollable optical fiber ribbon according to an exemplary embodiment.

Referring to FIG. 1, a rollable optical ribbon, shown as optical fiber ribbon 10, is shown according to an exemplary embodiment. Ribbon 10 includes a ribbon body, shown as ribbon matrix 12, and also includes an array 14 of a plurality of optical transmission elements, shown as optical fibers 16. Optical fibers 16 are coupled to and supported by the material of ribbon matrix 12. In the embodiment shown, ribbon 10 is shown in an unrolled or aligned position, and in this position, array 14 is a parallel array of optical fibers in which the central axes 18 of each fiber (i.e., the axis of each optical fiber 16 perpendicular to the cross-section shown in FIG. 2) are substantially parallel to each other. In other embodiments, the optical fibers may be arranged in non-parallel arrays within ribbon body 12 (e.g., two by two arrays, staggered arrays, etc.).

In the embodiment shown, ribbon 10 includes a single linear array 14 of optical fibers 14. In some other embodiments, ribbon 10 includes multiple arrays 14 of optical fibers 16. In some embodiments, ribbon 10 includes at least two linear arrays 14. In some other embodiments, ribbon 10 includes at least four linear arrays 14. In still other embodiments, ribbon 10 includes of at least eight linear arrays 14. In yet still other embodiments, ribbon 10 includes of at least 16 linear arrays 14. In some embodiments, each linear array 14 of ribbon 10 has at least two optical fibers 16. In some other embodiments, each linear array 14 of ribbon 10 has at least four optical fibers 16. In still other embodiments, each linear array 14 of ribbon 10 has at least 8 optical fibers 16. In yet still other embodiments, each linear array 14 of ribbon 10 has at least 12 optical fibers 16.

In the embodiment shown, each optical fiber 16 includes a central portion 20 that includes an optically transmitting optical core 22 and a cladding layer 24. Optical fibers 16 also each include a coating layer 26. Optical core 22 is formed from a material that transmits light, and optical core 22 is surrounded by a cladding layer 24 that has a different refractive index (e.g., a lower refractive index) than the optical core 22 such that the optical fiber acts as a waveguide that retains a light signal within optical core 22.

Coating layer 26 surrounds both optical core 22 and cladding layer 24. In particular, coating layer 26 has an inner surface that contacts and is bonded to the outer surface of cladding layer 24. Coating layer 26 also has an outer surface 28 that defines the outer or exterior surface of each optical fiber 16. In the embodiment shown, coating layer 26 is a single layer formed from a single material that provides protection (e.g., protection from scratches, chips, etc.) to optical fibers 16. In various embodiments, coating layer 26 may be a UV curable acrylate material, and may have a thickness between 10 μm and 100 μm. In the embodiment shown, an inner surface of ribbon matrix 12 is bonded, adhered or coupled to outer surface 28 of each optical fiber 16.

Figure 2:
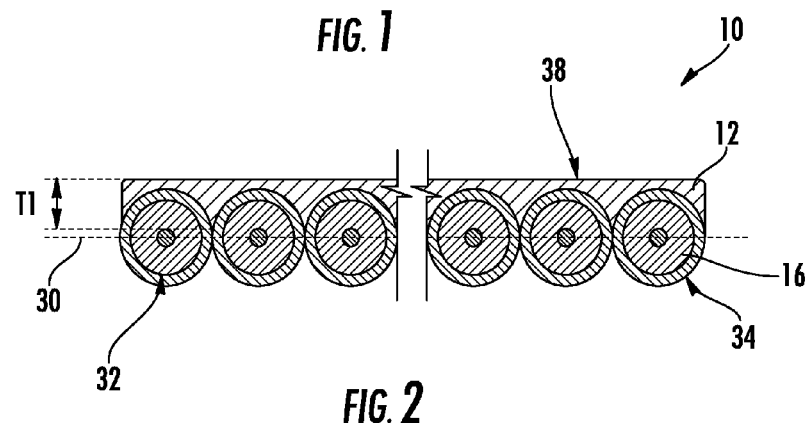
FIG. 2 shows a cross-sectional view of the optical fiber ribbon of FIG. 1 in an unrolled or aligned position according to an exemplary embodiment.
Figure 3:
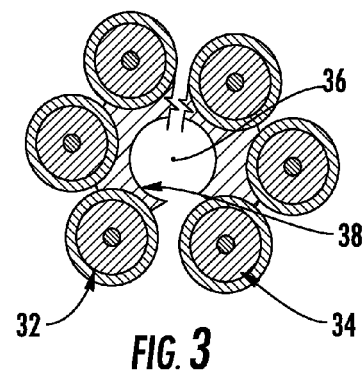
FIG. 3 shows a cross-sectional view of the optical fiber ribbon of FIG. 1 in a rolled or curved position according to an exemplary embodiment.

Ribbon matrix 12 is configured in various ways to allow ribbon 10 to be reversibly moved from an unrolled or aligned position (shown in FIGS. 1 and 2) to a curved or rolled position shown in FIG. 3, while still providing sufficient support and structure for fibers 16. It should be understood that FIGS. 2 and 3 only show the end portions of ribbon 10 for convenience, as represented by the break lines shown in FIGS. 2 and 3.

In the unrolled or aligned position, shown in FIGS. 1 and 2, optical fibers 16 of the linear array 14 are substantially aligned with each other such that the central axes of the optical fiber 16 are parallel to each other and lie along the same central fiber plane 30. As used herein, substantial alignment between optical fibers 16 allows for some deviation between the central axes of the optical fibers and central fiber plane 30, such that the central axis of each substantially aligned fiber is spaced less than 45 μm, in some embodiments less than 20 μm, in other embodiments less than 10 μm, and in other embodiments less than 5 μm, from central fiber plane 30 and/or the maximum vertical distance (in the orientation of FIGS. 1 and 2) between the center points of any of the fibers 16 is 90 μm or less. Further, in the unrolled or aligned position, the horizontal distance (in the orientation of FIGS. 1 and 2) between the optical fibers 16 at opposing ends of array 14, shown as first end fiber 32 and second end fiber 34, is at a maximum.

To move from the unrolled position of FIG. 2 to the rolled position shown in FIG. 3, ribbon matrix 12 is bent or curved around ribbon longitudinal axis 36. Thus, in the curved position, fibers 16 define an arc or curve around longitudinal axis 36, and the horizontal distance between first end fiber 32 and second end fiber 34 is decreased. In this arrangement, when rolled ribbon 10 is held straight the central axes of optical fibers 16 are substantially parallel to longitudinal axis 36. In the embodiment shown in FIG. 3, ribbon 10 in the curved position assumes a substantially circular arrangement such that first end fiber 32 is brought into close proximity or into contact with second end fiber 34. In the embodiment shown, ribbon matrix 12 is configured such that when ribbon 10 is rolled, ribbon matrix 12 is located on the inside of the rolled ribbon such that a surface 38 of ribbon matrix 12 opposite of optical fibers 16 faces longitudinal axis 36. In specific embodiments, the rollable ribbons discussed herein may be in a rolled configuration with the cable, and an end of the ribbon may be returned to the unrolled position to be coupled to an optical connector, such as via use of mass splicing equipment.

In various embodiments, the structure and/or material properties of ribbon matrix 12 discussed herein provides for an improved ribbon that balances rollability with fiber support. In various embodiments, ribbon matrix 12 only partially surrounds optical fibers 16. In contrast to non-rollable conventional optical ribbons in which the ribbon matrix completely surrounds the optical fibers, it is believed the rollability of ribbon 10 is enhanced by providing a ribbon matrix 12 that partially surrounds optical fibers 16. In this arrangement, the partial surrounding of optical fibers 16 provided by ribbon matrix 12 results in a ribbon 10 in which the outermost surface of ribbon 10 on one side of the ribbon (e.g., the upper side in the orientation of FIG. 2) is defined by surface 38 of ribbon matrix 12, and the outermost surface of ribbon 10 on the opposite side of the ribbon (e.g., the lower side in the orientation of FIG. 2) is defined by outer surface 28 of optical fibers 16.

Further, in this arrangement, ribbon matrix 12 is substantially located only on one side of ribbon 10. For example, as shown in FIG. 2, at least 90% of the material of ribbon matrix 12 is located on one side (e.g., above) of central fiber plane 30. In a specific embodiment, all or substantially all (e.g., greater than 99%) of ribbon matrix 12 is located on one side of central fiber plane 30. In such embodiments, without ribbon matrix 12 extending downward between adjacent optical fibers 16, optical fibers 16 are allowed to abut each other such that outer surface 28 of each optical fiber 16 contacts the outer surface 28 of at least one other optical fiber 16. As shown in FIG. 2, each of the interior optical fibers 16 abuts two adjacent optical fibers 16.

Further, as shown in FIG. 1, ribbon matrix 12 is a substantially contiguous ribbon matrix. In the embodiment shown, ribbon matrix 12 is contiguous (e.g., an unbroken, integral unitary body with no gaps or holes) in the lengthwise direction for at least 10 cm, specifically for at least 50 cm and more specifically for at least 1 m. In a specific embodiment, ribbon matrix 12 is contiguous (e.g., an unbroken, integral unitary body with no gaps or holes) in the lengthwise direction for the entire length of the ribbon. In addition, ribbon matrix 12 is contiguous in the widthwise direction such that ribbon matrix 12 extends over at least two of the optical fibers 16. In the specific embodiment shown, ribbon matrix 12 is contiguous in the widthwise direction such that ribbon matrix 12 extends over all of the optical fibers 16 of ribbon 10. Applicant believes that this arrangement provides suitable support and protection to optical fibers 16 while also providing a rollable ribbon 10.

Ribbon matrix 12 also has a thickness that provides a balance between suitable support and protection to optical fibers 16 and the rollability of ribbon 10. As shown in FIG. 2, ribbon matrix 12 has a maximum thickness shown as T1. In various embodiments, T1 is between 5 µm and 150 µm. In other embodiments, T1 is less than 125 µm, is less than 100 µm, is less than 50 µm, is less than 25 µm, and less than 10 µm. In some embodiments, T1 and the ranges discussed herein relate to an average thickness of ribbon matrix 12.

Ribbon matrix 12 is also formed from a material, e.g., a polymer material, such as a thermoplastic material or a curable polymer material, having a modulus of elasticity that provides a balance between suitable support and protection to optical fibers 16 and the rollability of ribbon 10. In various embodiments, the modulus of elasticity of the material of ribbon matrix 12 is less than 1500 MPa. In some embodiments, the modulus of elasticity of the material of ribbon matrix 12 is greater than 1 MPa and less than 1500 MPa, specifically greater than 10 MPa and less than 1500 MPa, and in some embodiments is greater than 85 MPa and less than 1500 MPa.

In some embodiments, ribbon matrix 12 is formed from a single layer of polymer material having a modulus of elasticity greater than 10 MPa and less than 100 MPa. In other embodiments, ribbon matrix 12 is comprised of two layers, an inner layer and an outer layer. In some embodiments, the inner layer is in contact with optical fibers 16 and the outer layer defines the outer surface of the ribbon. In specific embodiments, the inner layer has a modulus of elasticity less than 1.5 MPa, and the outer layer has a modulus of elasticity greater than 1000 MPa. In specific embodiments, the total thickness of the two layer ribbon matrix 12 is less than 40 microns, and in other embodiments, is less than 30 microns, or is less than 20 microns in still other embodiments.

In various embodiments, ribbon matrix 12 and optical fibers 16 may be configured to facilitate identification and connectorization of ribbon 10. In such embodiments, ribbon matrix 12 and/or optical fibers 16 may include coloring or printed indicia to identify the type, location, etc., of optical fibers 16 within ribbon 10.

Figure 4:
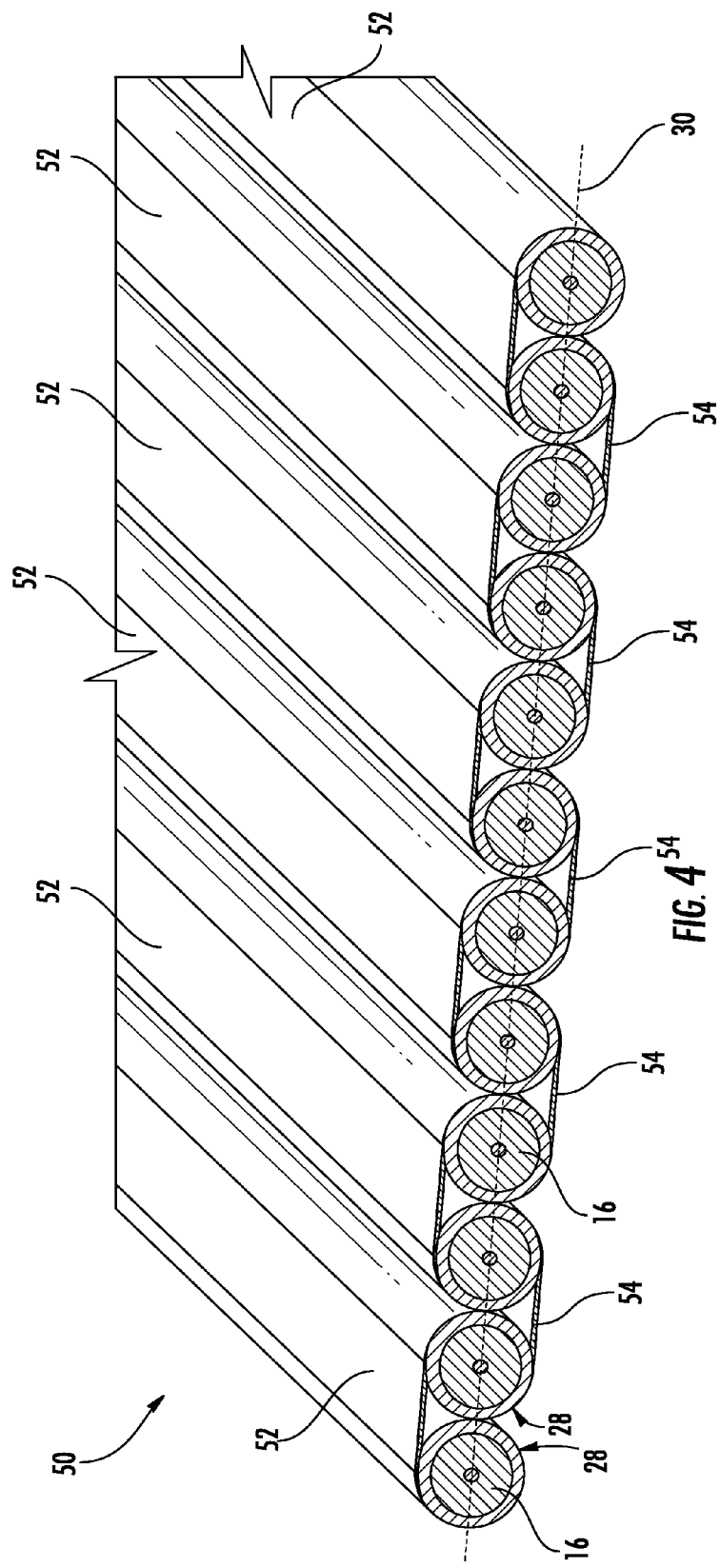
FIG. 4 shows a perspective view of a rollable optical fiber ribbon according to another exemplary embodiment.

Referring to FIG. 4, another optical ribbon, shown as rollable optical fiber ribbon 50, is shown according to an exemplary embodiment. Ribbon 50 is substantially similar to ribbon 10 except as discussed herein. Ribbon 50 includes a ribbon body including a plurality of alternating ribbon bridges, shown as upper webs 52 and lower webs 54. In general, webs 52 and 54 are bands of polymer material that are coupled between outer surfaces 28 of adjacent optical fibers 16. Webs 52 and 54 are contiguous in the lengthwise direction and each extends over at least two optical fibers 16. Webs 52 and 54 are spaced from central fiber plane 30 such that outermost, planar surfaces of webs 52 and 54 are substantially parallel to fiber plane 30 and are positioned tangentially to the outer surface 28 of adjacent fiber pairs.

In the embodiment shown, each web 52 and 54 extends over and is coupled to two optical fibers 16. Webs 52 and 54 are positioned on alternating sides of ribbon 10 such that in the horizontal direction one web 54 is located between adjacent pairs of webs 52. Further, webs 52 and 54 alternately define the uppermost and lowermost surfaces of ribbon 50 at the positions of webs 52 and 54. In this embodiment, webs 52 and 54 are relatively thin having a thickness between 5 microns and 150 microns. Further, it is believed that the alternating positioning of webs 52 and 54 allows ribbon 50 to be rolled in either direction, and by offsetting webs 52 and 54 from central fiber plane 30, bending strain on the ribbon material may be reduced.

Figure 5:
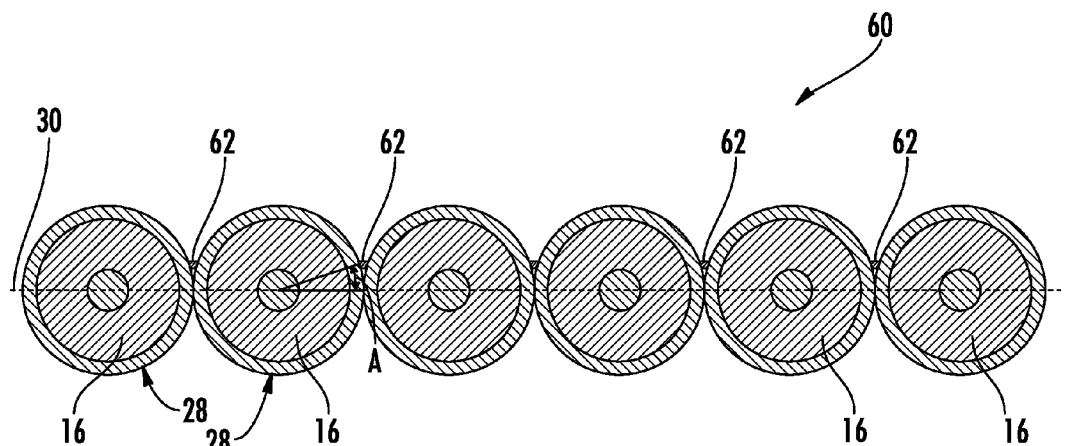
FIG. 5 shows a cross-sectional view of a rollable optical fiber ribbon according to another exemplary embodiment.

Referring to FIG. 5, another optical ribbon, shown as rollable optical fiber ribbon 60, is shown according to an exemplary embodiment. Ribbon 60 is substantially similar to ribbon 10, except as discussed herein. Ribbon 60 includes a ribbon body including a plurality of ribbon bridges, shown as webs 62. In general, webs 62 are bands of polymer material that are coupled between outer surfaces 28 of adjacent optical fibers 16. Webs 62 are contiguous in the lengthwise direction and each extends between the outer surfaces of two adjacent optical fibers 16. Webs 62 are spaced from central fiber plane 30 such that outermost, planar surfaces of webs 62 are substantially parallel to fiber plane 30, and webs 62 are located below the outermost portion of surface 28. In various embodiments, the angular positioning of webs 62 relative to the central fiber plan 30 is shown by angle A. In various embodiments, angle A is greater than 0 degrees and less than 90 degrees, specifically is between 5 degrees and 45 degrees, and more specifically is between 10 degrees and 20 degrees. In a specific embodiment, angle A is about 15 degrees (e.g., 15 degrees plus or minus 1 degree). In various embodiments, webs 62 have a thickness between 5 microns and 75 microns.

Figure 6:
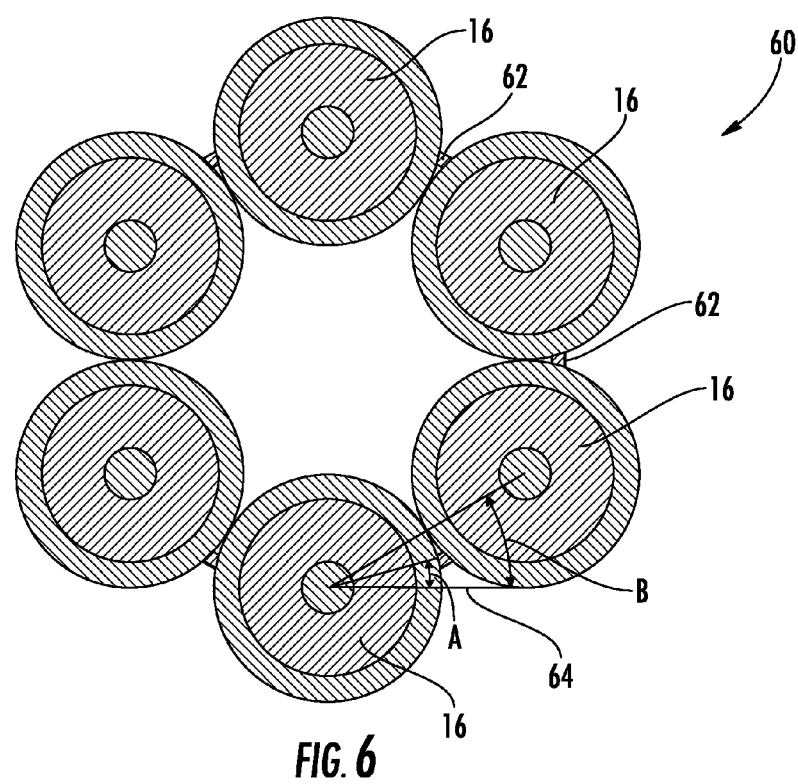
FIG. 6 shows a cross-sectional view of the rollable optical fiber ribbon of FIG. 5 in a rolled or curved position according to an exemplary embodiment.

Referring to FIG. 6, ribbon 60 is shown in the rolled or curved position according to an exemplary embodiment. In this embodiment, ribbon 60 is rolled such that webs 62 face outward from rolled ribbon 60. Further, ribbon 60 is rolled defining an angle B between center points of two adjacent optical fibers 16, as measured from a horizontal plane 64. In general angle B represents the degree of bend allowed by webs 62. In various embodiments, angle B is between 10 degrees and 90 degrees, specifically is between 15 degrees and 45 degrees and more specifically is about 30 degrees (e.g., 30 degrees plus or minus 1 degree). In an embodiment in which ribbon 60 includes 6 optical fibers 16, webs 62 allow ribbon 60 to be rolled into a hexagonal array as shown in FIG. 6.

Figure 7:
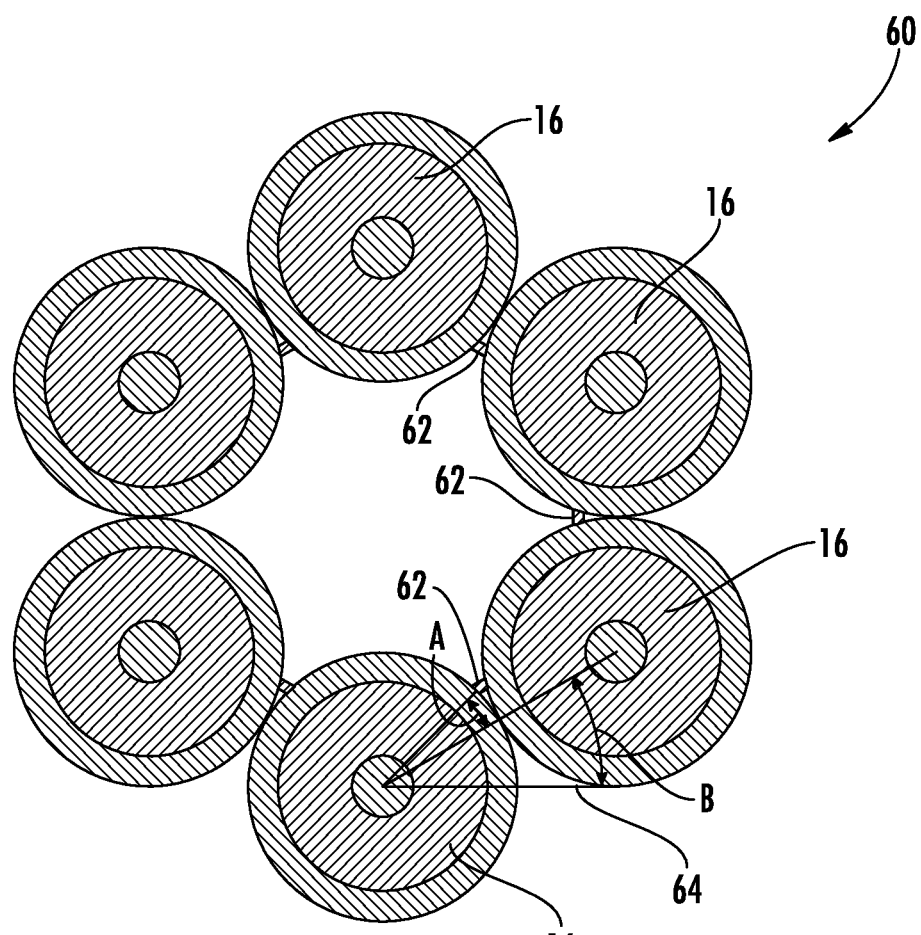
FIG. 7 shows a cross-sectional view of the rollable optical fiber ribbon of FIG. 5 in another rolled or curved position according to an exemplary embodiment.

Referring to FIG. 7, ribbon 60 is shown in the rolled or curved position according to another exemplary embodiment. In this embodiment, ribbon 60 is rolled such that webs 62 face inward toward the longitudinal axis of rolled ribbon 60. In various embodiments, webs 62 may be formed from material having elasticity that allows ribbon 60 to be rolled in both the configuration shown in FIG. 6 and in FIG. 7.

Figure 8:
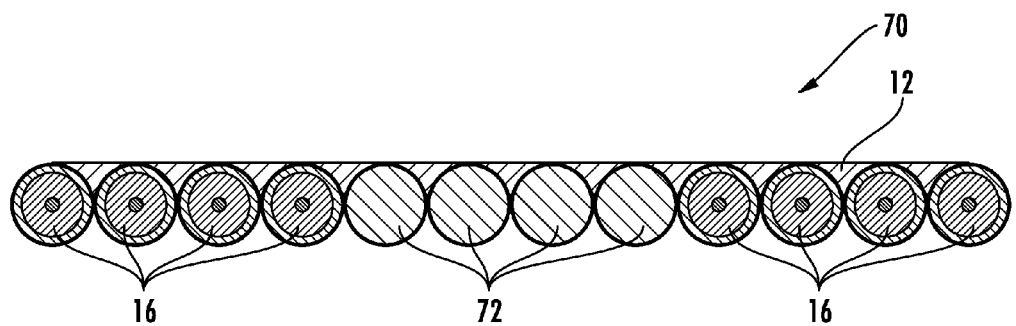
FIG. 8 shows a cross-sectional view of a rollable optical fiber ribbon according to another exemplary embodiment.

Referring to FIG. 8, another optical ribbon, shown as rollable optical fiber ribbon 70, is shown according to an exemplary embodiment. Ribbon 70 is substantially similar to ribbon 10 except as discussed herein. Ribbon 70 includes eight optical fibers 16 supported by ribbon matrix 12. Ribbon 70 includes a plurality of strength elements, shown as aramid yarn strands 72, supported from ribbon matrix 12. In the embodiment shown, aramid yarn strands 72 are located in the center of ribbon 70 such that two end groups of optical fibers 16 are formed. In other embodiments, aramid yarn strands 72 may be positioned at any other positions within ribbon matrix 12. Further, in other embodiments, ribbon 70 may include other strength elements, such as steel wire, glass reinforced plastics, other strength yarn types, etc., in place of aramid yarn strands 72.

Figure 9:
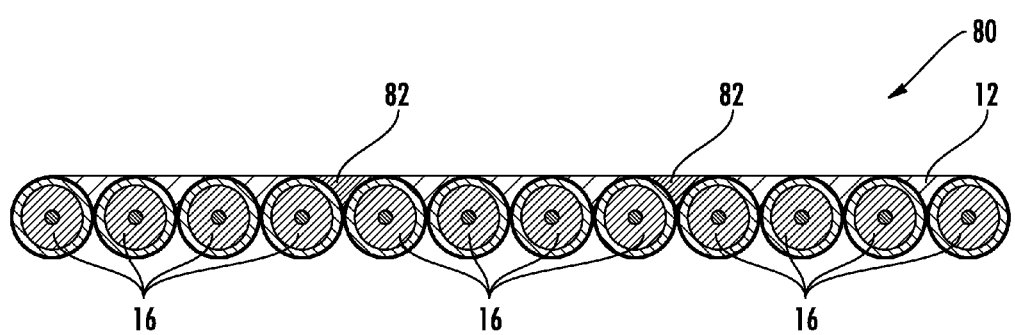
FIG. 9 shows a cross-sectional view of a rollable optical fiber ribbon according to another exemplary embodiment.

Referring to FIG. 9, another optical ribbon, shown as rollable optical fiber ribbon 80, is shown according to an exemplary embodiment. Ribbon 80 is substantially similar to ribbon 10 except as discussed herein. Ribbon 80 includes one or more regions, shown as regions 82, within ribbon matrix 12 that is formed from a different material than the rest of ribbon matrix 12. In some such embodiments, regions 82 are formed from a polymer material having a lower modulus of elasticity than the rest of ribbon matrix 12. Further, regions 82 may be formed from a material that has low bonding with the material forming the rest of ribbon matrix 12, and in yet other embodiments, regions 82 may be thinner than adjacent regions of ribbon matrix 12. In such embodiments, regions 82 act as separation points allowing groups of optical fibers 16 to be separated from each other. In specific embodiments, regions 82 are formed from a polymer material having a modulus of elasticity lower than that of the material forming the rest of ribbon matrix 12, and the modulus of elasticity of the material of regions 82 is between 0.5 and 1000 MPa. In other embodiments, ribbon 80 may include other tear features, ripcords, scores, etc. in place of or in addition to regions 82. In specific embodiments, regions 82 may be colored differently from the rest of ribbon matrix 12 or include printed indicia that provides an indication of the location of regions 82. In some embodiments, regions 82 may extend the entire length of ribbon 80, and in other embodiments, regions 82 may only be located at certain portions along the length of ribbon 80 providing differing accessibility to optical fibers 16, along the length of ribbon 80.

Figure 10:
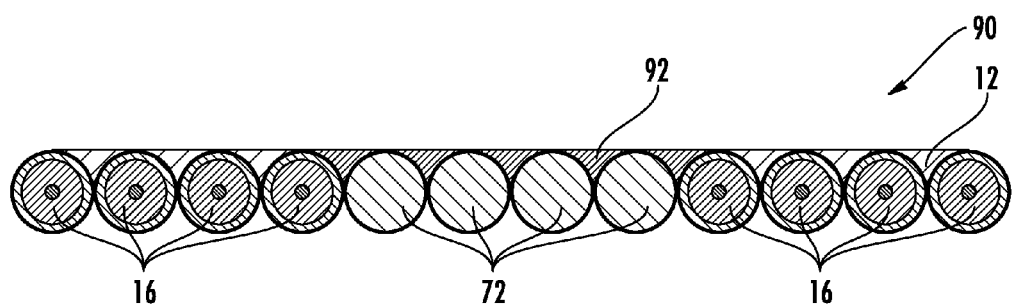
FIG. 10 shows a cross-sectional view of a rollable optical fiber ribbon according to another exemplary embodiment.

Referring to FIG. 10, another optical ribbon, shown as rollable optical fiber ribbon 90, is shown according to an exemplary embodiment. Ribbon 90 is substantially similar to ribbon 70 except as discussed herein. In this embodiment, ribbon matrix 12 of ribbon 90 includes a region 92 in which aramid yarn strands 72 are supported. In such embodiments, region 92 may be similar to regions 82 in that region 92 has a lower modulus of elasticity than the rest of ribbon matrix 12, which facilitates separation of aramid yarn strands 72 from optical fibers 16. Such separation of aramid yarn strands 72 may be desirable during some connectorization procedures.

Figure 11:
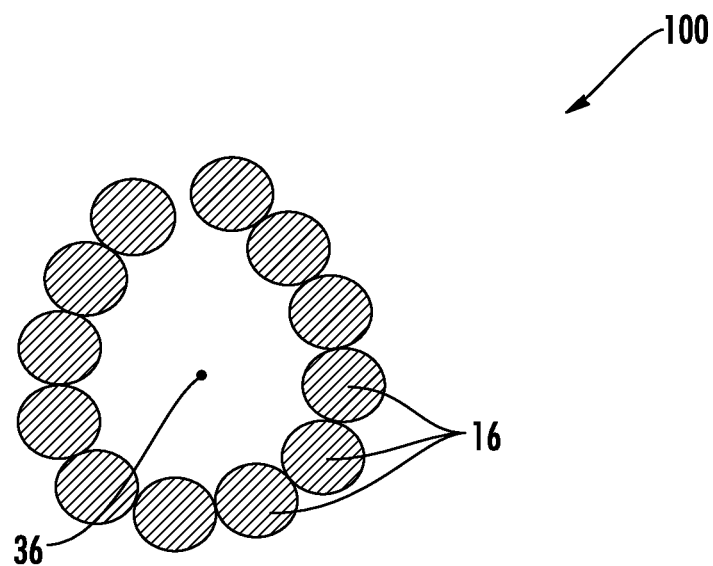
FIG. 11 shows a cross-sectional view of a rollable optical fiber ribbon in a rolled or curved position according to another exemplary embodiment.
Figure 12:
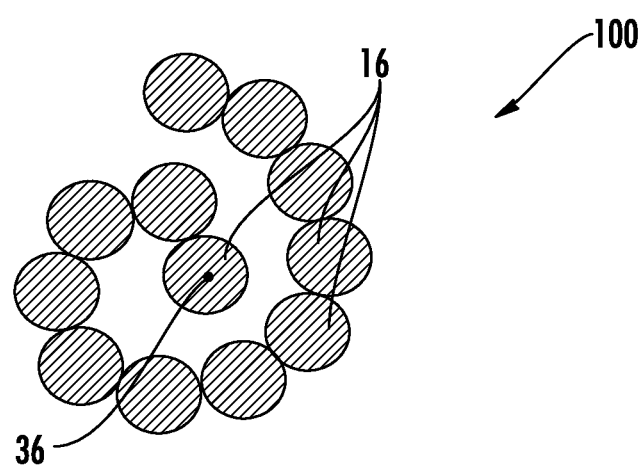
FIG. 12 shows a cross-sectional view of a rollable optical fiber ribbon in a rolled or curved position according to another exemplary embodiment.

FIGS. 11 and 12 show an optical fiber ribbon 100 in various curved or rolled configurations. It should be understood that optical fiber ribbon 100 may be any of the optical fiber ribbon embodiments discussed herein. As shown in FIG. 11, optical fiber ribbon 100 may be rolled into a non-circular shape in which optical fibers 16 surround longitudinal ribbon axis 36. As shown in FIG. 12, optical fiber ribbon 100 may be rolled into a spiral shape in which most of the optical fibers 16 surround longitudinal ribbon axis 36 and the innermost end optical fiber 16, resides at or near longitudinal ribbon axis 36. In some embodiments, the rolled arrangements shown in FIGS. 11 and 12, may allow ribbon 100 to be stranded or otherwise located within a cable without first being located within a buffer tube.

In various embodiments, when an optical fiber ribbon containing glass optical fibers, such as ribbon 100, is rolled or folded into a non-planar array, the minimum bending stiffness tends to increase significantly because there will no longer exist a bend axis that allows all of the glass fibers to occupy the neutral axis. As a result, not only will the rolled ribbon be stiffer than a planar ribbon, but also the material of the ribbon body may also be subject to significant shear stress in order to maintain the rolled ribbon as a coherent composite structure. In some embodiments, the material of the ribbon bodies discussed herein have sufficient strength and elasticity to resist the forces associated with stranding of the rolled ribbon 100 into a cable and also those forces associated with the bending of the cable as it is stored, installed and put in use. In other embodiments, the ribbon bodies discussed herein are designed to intentionally separate at more moderate stress levels, relieving stress as needed while remaining intact at sufficient intervals along the length to provide the intended fiber organization benefit.

Figure 13:
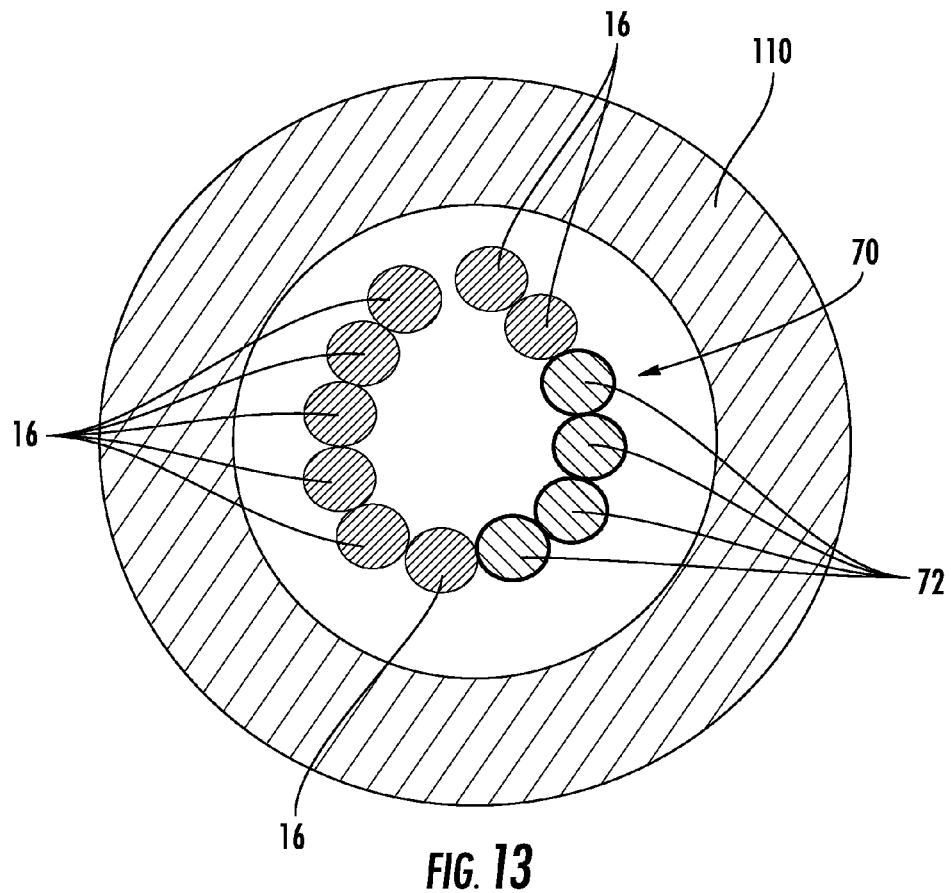
FIG. 13 shows a cross-sectional view of a rollable optical fiber ribbon in a rolled or curved position located within a buffer tube according to another exemplary embodiment.
Figure 14:
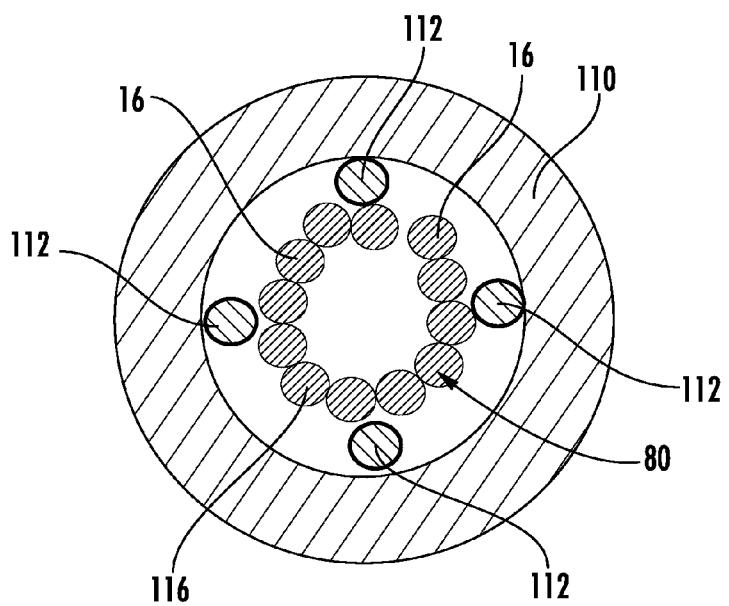
FIG. 14 shows a cross-sectional view of a rollable optical fiber ribbon in a rolled or curved position located within a buffer tube according to another exemplary embodiment.

Referring to FIGS. 13 and 14, the various ribbon embodiments discussed herein may be located within a polymeric buffer tube 110, which in turn may be incorporated into a fiber optic cable. As shown in FIG. 13, optical fiber ribbon 70, which includes embedded aramid yarn strands 72, may be rolled and located within buffer tube 110 without additional loose strength elements. In another embodiment, as shown in FIG. 14, an optical fiber ribbon without embedded strength elements, such as optical fiber ribbon 80, may be rolled and located within buffer tube 110, and additional loose strength elements, shown as loose aramid yarn strands 112, may be included within buffer tube 110. In other embodiments, the rollable optical fiber ribbons discussed herein may be used within cables without buffer tubes surrounding the ribbons. In such embodiments, the rolled optical fiber ribbons may be directly positioned within a cable jacket and may be stranded around a central strength member.

In various embodiments, the ribbon bodies discussed herein may be formed by applying a polymer material, such as a UV curable polymer material, around optical fibers 16 in the desired arrangement to form a particular ribbon body. The polymer material is then cured forming the integral, contiguous ribbon body while also coupling the ribbon body to the optical fibers. In other embodiments, the ribbon bodies discussed herein may be formed from any suitable polymer material, including thermoplastic materials and thermoset materials.

Figure 15:
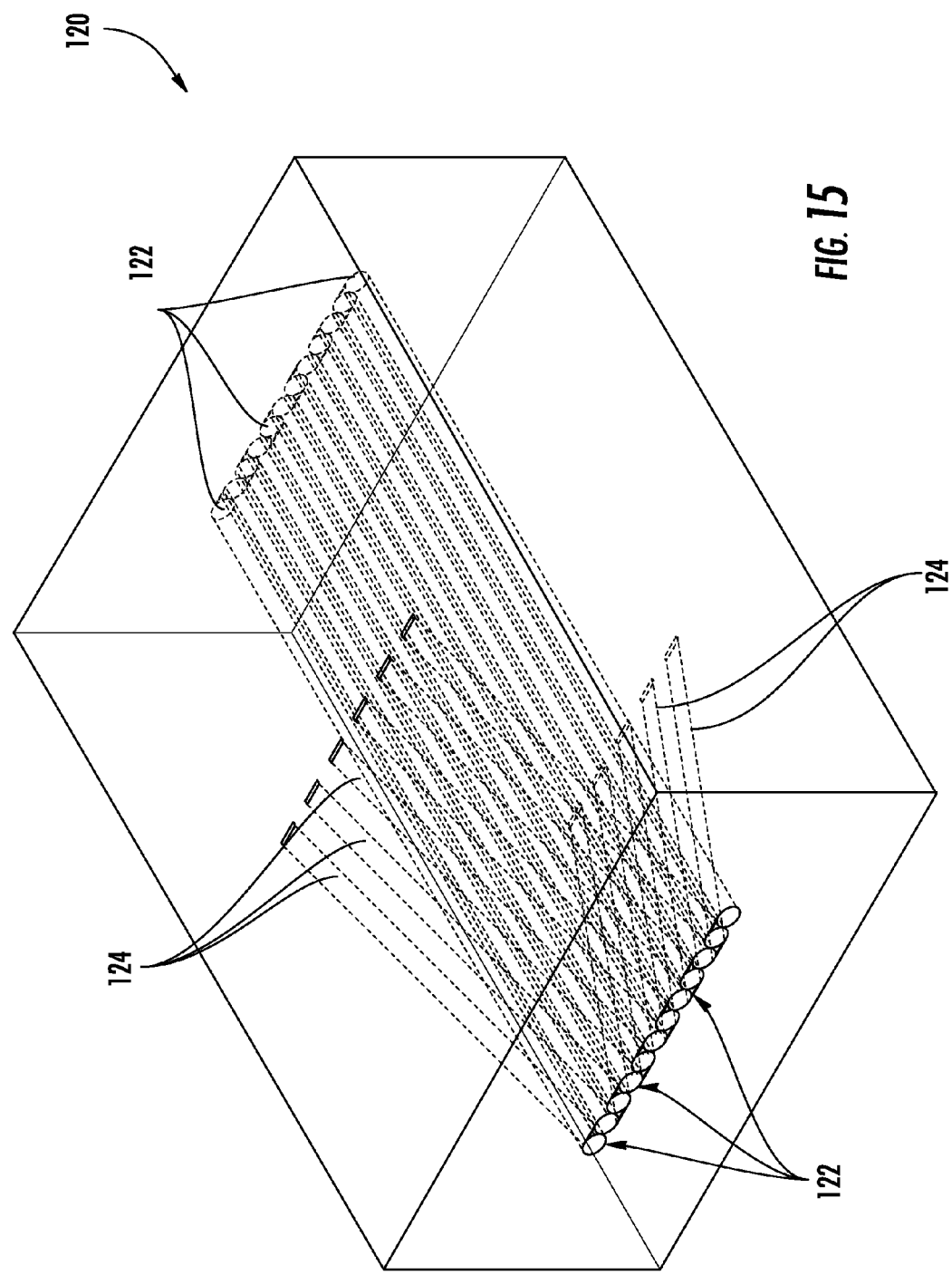
FIG. 15 shows a system configured to form a rollable optical fiber ribbon according to an exemplary embodiment.

FIG. 15 shows an exemplary tool for forming a ribbon body. Tool 120 consists of a block of abrasion resistant material bored with a series of fiber channels 122 to guide an array of optical fibers 16 that are pulled through tool 120. Resin channels 124 convey liquid resin in a path that intersects fiber channels 122 at the exit of the tool. UV curable liquid resin as an example could be applied using the tool and immediately cured by the use of UV lamps positioned at the tool exit to form the polymer ribbon bodies discussed herein. In various embodiments, the shape of the interface between fiber channels 122 and resin channels 124 may be configured to form any of the ribbon body shapes discussed herein. Further, to form ribbons (such as ribbons 10, 60, 70, 80 and 90) in which the ribbon body is only on one side of optical fibers 16, tool 120 would be operated to supply resin only through either the upper series or through the lower series of resin channels 124. To form a ribbon, such as ribbon 50 having ribbon body portions on both sides of the ribbon resin would be supplied through both the upper series and through the lower series of resin channels 124.

Figure 16:
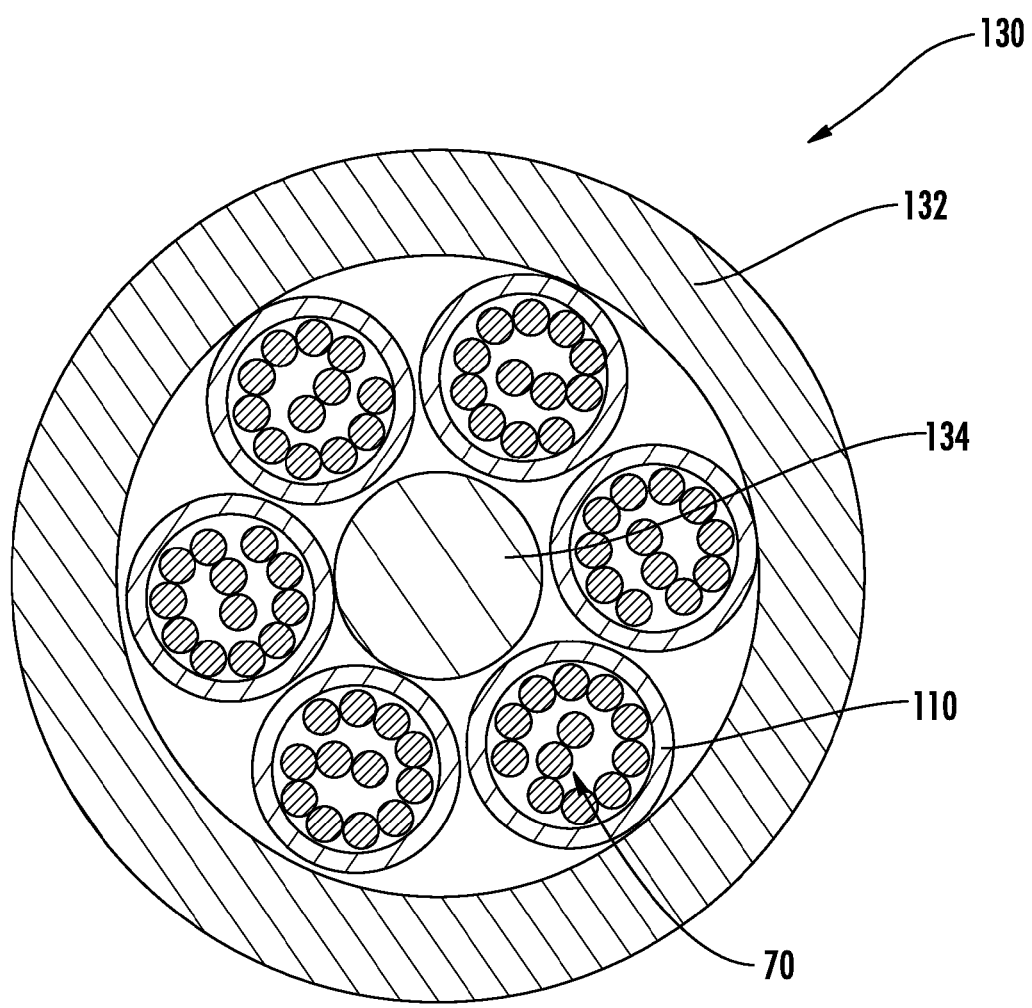
FIG. 16 is a cross-sectional view of cable including rollable optical fiber ribbons according to an exemplary embodiment.

Referring to FIG. 16, in various embodiments, any of the ribbons discussed herein may be incorporated into a cable, such as cable 130. Cable 130 includes a polymeric cable jacket 132 and a elongate strength member 134 (e.g., a GRP rod, metal wire, etc.) located within cable jacket 132. A plurality of optical fiber ribbon containing buffer tubes 110 surround strength member 134, and each buffer tube 110 includes an optical fiber ribbon, such as ribbon 70 discussed above. It should be understood however that cable 130 may include any of the ribbon embodiments discussed herein in any combination. In various embodiments, a binding element, such as a helically wound binder yarn or thin film binder, may be located to the outside of buffer tubes 110 and surrounding buffer tubes 110 and may act to hold buffer tubes 110 in a stranded pattern (e.g., an SZ stranding pattern) around strength member 134. In other embodiments, cable 130 includes no binding element. In various embodiments, cable 130 may include rolled ribbons located within the cable without buffer tubes 110. In such embodiments, the ribbons may be rolled and then stranded around strength member 134. In some such embodiments, cable 130 may optionally include a binding element surrounding the rolled ribbons, and the binding element acts to bind the rolled ribbons to strength member 134. In various embodiments, each rolled ribbon may be surrounded by a binder element that helps hold the rolled ribbon in the rolled position, and in some such embodiments, the binder element may be color-coded to help identify a particular ribbon within cable 130. In some other embodiments, cable 130 may include one or more strength member (e.g., a GRP rod, metal wire, etc.) embedded within jacket 132 in place of or in addition to strength member 134, and in some such embodiments, the optical fiber ribbons are located within cable 130 without buffer tubes.

It should understood that the optical ribbons discussed herein can include various numbers of optical fibers 16. In various exemplary embodiments, the optical ribbons discussed herein may include 2, 4, 6, 8, 10, 12, 14, 16, 24 etc. optical fibers or transmission elements (e.g., optical fibers 16). While the ribbon embodiments discussed herein are shown having optical fibers 16 arranged in a substantially parallel, linear array, optical fibers 16 may be arranged in a square array, rectangular array, a staggered array, or any other spatial pattern that may be desirable for a particular application. In various embodiments, optical fibers 16 can include a wide variety of optical fibers including multi-mode fibers, single mode fibers, bend insensitive/resistant fibers, etc. In other embodiment, the optical ribbons discussed herein may include a multi-core optical fiber located within ribbon matrix 12. In this embodiment, a single, integral optical structure having multiple optical transmission elements (e.g., multiple optical cores surrounded by cladding) may be provided, and the single multi-core optical fiber is embedded in one of the stress-isolating ribbon matrix embodiments and/or coated with a coating layer (e.g., coating layer 26) as discussed herein. In specific exemplary embodiments, optical fibers 16 may be Corning's Ultra® SMF-28, ClearCurve® LBL and ZBL G.652 compatible optical fibers.

In various embodiments, the optical fiber ribbon embodiments discussed herein may include optical fibers that do not include coating layer 26. In these embodiments, cladding 24 defines the outer surface of optical fibers 16. In these embodiments, the inner surface of the innermost ribbon body layer contacts the outer surface of cladding 24. In another such embodiment, the ribbon body may include a single inner most layer formed from the high modulus material of coating layer 26.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A rollable optical fiber ribbon comprising:
a plurality of optical transmission elements, wherein each optical transmission element includes an optical core surrounded by a cladding of a different refractive index than the optical core, the cladding surrounded by a fiber coating layer, the fiber coating layer having an inner surface contacting the cladding and an outer surface defining an exterior surface of the optical transmission elements; and
a ribbon body coupled to and supporting the plurality of optical transmission elements in an array, wherein the ribbon body is contiguous lengthwise for at least 10 cm along the length of the plurality of optical transmission elements and wherein the ribbon body is contiguous widthwise over all of the plurality of optical transmission elements;
wherein the ribbon body is formed from a flexible polymeric material such that the plurality of optical transmission elements are reversibly movable from an unrolled position in which the plurality of optical transmission elements are substantially aligned with each other to a rolled position; and wherein the ribbon body partially surrounds the plurality of optical transmission elements such that an outer surface of the ribbon body defines an outermost surface on an entire first side of the ribbon and the fiber coating layers define an outermost surface on a second side of the ribbon opposite the first side of the ribbon.

2. The rollable optical fiber ribbon of claim 1, wherein the ribbon body includes an inner surface bonded to the exterior surfaces of the plurality of optical transmission elements.

3. The rollable optical fiber ribbon of claim 1, wherein each of the plurality of optical transmission elements includes a central axis extending through a center point of the optical core, wherein in the unrolled position at least 90% of the polymeric material of the ribbon body is located on one side of central axes of the plurality of optical transmission elements, wherein in the rolled position, the central axes of the optical transmission elements surround a central axis of the ribbon when viewed in cross-section perpendicular to the central axis of the ribbon.

4. The rollable optical fiber ribbon of claim 3, wherein, in the unrolled position, all of the polymeric material of the ribbon body is located on one side of central axes of the plurality of optical transmission elements.

5. The rollable optical fiber ribbon of claim 3, wherein the exterior surface of each of the plurality of optical transmission elements abuts the exterior surface of at least one other optical transmission element.

6. The rollable optical fiber ribbon of claim 1, wherein the polymeric material has a modulus of elasticity less than 1500 MPa.

7. The rollable optical fiber ribbon of claim 6, wherein the polymeric material has a modulus of elasticity greater than 1 MPa and less than 1500 MPa.

8. The rollable optical fiber ribbon of claim 7, wherein the polymeric material has a modulus of elasticity greater than 85 MPa and less than 1500 MPa.

9. The rollable optical fiber of claim 1, further comprising a strength element coupled to and supported by the ribbon body such that the strength element is aligned with the plurality of optical transmission elements in the unrolled position.

10. The rollable optical fiber of claim 1, wherein the polymeric material is a first polymeric material, wherein the ribbon body further comprises a second polymeric material, wherein the first polymeric material has a modulus of elasticity greater than the modulus of elasticity of the second polymeric material.

11. An optical ribbon comprising:
a plurality of optical transmission elements, wherein each optical transmission element includes an optical core and an exterior surface; and
a ribbon body coupled to and supporting the plurality of optical transmission elements, wherein the ribbon body is contiguous lengthwise for at least 10 cm along the length of the plurality of optical transmission elements;
wherein the ribbon body is formed from a flexible polymeric material such that the plurality of optical transmission elements are reversibly movable between an aligned position in which the plurality of optical transmission elements are substantially parallel with each other and a curved position;
wherein each of the plurality of optical transmission elements includes a central axis extending through a center point of the optical core, wherein in the aligned position at least 90% of the polymeric material of the ribbon body is located on one side of central axes of the plurality of optical transmission elements;
wherein the ribbon body is positioned relative to the plurality of optical transmission elements such that the exterior surface of each of the plurality of optical transmission elements abuts the exterior surface of at least one other optical transmission element when in the aligned position.

12. The optical ribbon of claim 11, wherein the ribbon body partially surrounds the plurality of optical transmission elements such that an outer surface of the ribbon body defines an outermost surface on a first side of the ribbon and the exterior surfaces of the plurality of optical transmission elements define an outermost surface on a second side of the ribbon opposite the first side of the ribbon.

13. The optical ribbon of claim 11, wherein in the aligned position all of the polymeric material of the ribbon body is located to one side of central axes of the plurality of optical transmission elements.

14. The optical ribbon of claim 11, wherein the ribbon body comprises a plurality of bridges formed from the polymeric material coupled between the exterior surfaces of adjacent optical transmission elements.

15. The optical ribbon of claim 11, wherein the polymeric material has a modulus of elasticity greater than 85 MPa and less than 1500 MPa and a maximum thickness between 5 μm and 150 μm.

16. An optical fiber ribbon comprising:
a plurality of optical fibers; and
a flexible ribbon body coupled to and supporting the plurality of optical fibers, wherein the ribbon body is contiguous lengthwise for at least 10 cm along the length of the plurality of optical fibers;
wherein the ribbon body is formed from a flexible polymeric material such that the plurality of optical fibers are bendable around a longitudinal axis of the ribbon;
wherein each of the plurality of optical fibers includes a central axis and at least 90% of the polymeric material of the ribbon body is located on one side of the central axes of the plurality of optical fibers;
wherein the ribbon body partially surrounds all of the plurality of optical fibers such that, when viewed in cross-section, an outer surface of the ribbon body defines an outermost surface on an entire first side of the ribbon and exterior surfaces of the optical fibers define an outermost surface on a second side of the ribbon opposite the first side of the ribbon.

17. The optical fiber ribbon of claim 16, wherein the polymeric material allows the ribbon to bend such that an angle between center points of two of the adjacent optical fibers measured from a horizontal plane is between 10 degrees and 90 degrees.

18. The optical fiber ribbon of claim 17, wherein the exterior surface of at least one of the plurality of optical fibers abuts the exterior surface of at least one other optical fiber.

19. The optical fiber ribbon of claim 17, wherein the polymeric material has a modulus of elasticity greater than 85 MPa and less than 1500 MPa and a maximum thickness between 5 μm and 150 μm.

* * * * *

UNITED STATES PATENT AND TRADEMARK OFFICE
CERTIFICATE OF CORRECTION

PATENT NO. : 9,939,599 B2
APPLICATION NO. : 15/216757
DATED : April 10, 2018
INVENTOR(S) : Bradley Jerome Blazer et al.

Page 1 of 1

It is certified that error appears in the above-identified patent and that said Letters Patent is hereby corrected as shown below:

On the Title Page

In Column 2, item (56), other publications, Line 1, delete "Anritten" and insert -- Written --, therefor.

In the Claims

In Column 11, Line 63, Claim 9, after "fiber" insert -- ribbon --.

In Column 12, Line 1, Claim 10, after "fiber" insert -- ribbon --.

Signed and Sealed this
Second Day of June, 2020

Andrei Iancu
*Director of the United States Patent and Trademark Office*